(12) United States Patent
Gretz

(10) Patent No.: US 8,076,578 B1
(45) Date of Patent: Dec. 13, 2011

(54) ADJUSTABLE ELECTRICAL OUTLET BOX ASSEMBLY

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 246 days.

(21) Appl. No.: 12/655,512

(22) Filed: Dec. 30, 2009

(51) Int. Cl.
*H01H 9/02* (2006.01)

(52) U.S. Cl. ............... 174/57; 174/50; 174/58; 439/535; 248/343

(58) Field of Classification Search .............. 174/50, 174/58, 63; 439/535; 220/4.02; 248/343, 248/906
See application file for complete search history.

(56) References Cited

U.S. PATENT DOCUMENTS

| 5,289,934 | A |   | 3/1994  | Smith et al. |        |
|-----------|---|---|---------|--------------|--------|
| 7,312,395 | B1|   | 12/2007 | Gretz        |        |
| 7,476,807 | B1|   | 1/2009  | Gretz        |        |
| 7,786,379 | B1| * | 8/2010  | Kwong et al. | 174/58 |
| 7,807,923 | B2| * | 10/2010 | Moran        | 174/50 |
| 7,902,457 | B2| * | 3/2011  | Johnson      | 174/61 |
| 7,964,794 | B2| * | 6/2011  | Chung        | 174/58 |

* cited by examiner

*Primary Examiner* — Dhirubhai R Patel

(57) ABSTRACT

An adjustable outlet box assembly for mounting a receptacle or similar electrical device within a wall. The adjustable box includes an outlet box and a bracket that slides with respect to the box. An adjustment screw, accessible from the front of the assembly, can be rotated to move the box with respect to a stud to which the outlet box is secured thereby allowing adjustment of the outlet box face so that it is flush with the wall surface. The bracket provides a front plate for securing to the front of a stud and a side plate having ears for securing to the side of a stud. The adjustment screw engages straps that are bent outwards from the side plate to enable the bracket to slide with respect to the outlet box as well as a rearwardly located integral flange to which the adjustment screw is introduced upon tightening thereof.

2 Claims, 3 Drawing Sheets

US 8,076,578 B1

ADJUSTABLE ELECTRICAL OUTLET BOX ASSEMBLY

FIELD OF THE INVENTION

This invention relates to assemblies for the mounting of electrical devices and specifically to an adjustable outlet box assembly that includes a bracket and an adjusting screw for adjusting the position of the box with respect to the bracket. The adjusting screw can be used to adjust the front of the box planar with the wall surface.

BACKGROUND OF THE INVENTION

A common goal in installing electrical outlet boxes on interior walls is to install the front face of the box substantially flush with the wall surface. Conventional outlet boxes are typically fastened to a wall stud before the drywall is applied to the studs. As drywall is supplied in various thicknesses, it is difficult for the installer of the outlet boxes to position them correctly with respect to the eventual wall surface.

To provide a means of adjusting the face of the outlet box substantially flush with the wall surface, adjustable outlet boxes have been proposed. The adjustable outlet boxes typically include a bracket and a mechanism for adjusting the face of the outlet box with respect to the wall surface.

Although several adjustable outlet boxes have been proposed, there is still a need for an adjustable outlet box that can be securely fastened to a stud. Additionally, brackets suggested by the prior art are typically of complex design, which increases the production cost of the prior art brackets.

What is needed therefore is an adjustable electrical outlet box that is of simple design to enable it to be easily manufactured. Additionally, the adjustable outlet box should be capable of being securely fastened to a stud such that the box will not become loose from the supporting stud. These and other advantages can be realized with the adjustable outlet box proposed herein in the present invention.

U.S. Pat. No. 7,312,395 describes an adjustable electrical outlet box assembly for mounting a duplex receptacle or similar electrical device within a wall. The adjustable box assembly includes a metal outlet box and a bracket that can slide with respect to the box. An adjustment screw, accessible from the front of the assembly, can be rotated to move the box with respect to the stud it is secured to and thereby adjust the face of the outlet box so that it is substantially flush with the wall surface. The bracket portion of the adjustable box assembly, which may be simply stamped and formed from sheet metal, provides a front plate for securing to the front of a stud and a side plate having widely spaced ears for securing to the side of a stud. The adjustment screw engages straps that are bent outwards from the side plate to enable the bracket to slide with respect to the outlet box. While providing a solution to the aforementioned problems, this adjustable box may lack stability when installed due to the asymmetry of the torque applied to the adjustment screw at installation. The application of too much or too little torque can result in the face of the outlet box being skewed with respect to the adjoining wall.

OBJECT OF THE INVENTION

It is therefore an object of the present invention to provide an adjustable outlet box that is significantly more stable and predictably installable than that described in U.S. Pat. No. 7,312,395.

SUMMARY OF THE INVENTION

The invention is an adjustable electrical outlet box assembly for mounting a receptacle or similar electrical device within a wall. The adjustable box assembly includes an outlet box and a bracket that can slide with respect to the box. An adjustment screw, accessible from the front of the assembly, can be rotated to move the box with respect to a stud to which the outlet box is secured thereby allowing adjustment of the outlet box face so that it is flush with the wall surface. The bracket provides a front plate for securing to the front of a stud and a side plate having ears for securing to the side of a stud. The adjustment screw engages straps that are bent outwards from the side plate to enable the bracket to slide with respect to the outlet box as well as a rearwardly located integral flange to which the adjustment screw is introduced upon tightening thereof.

DETAILED DESCRIPTION

Figure 1:
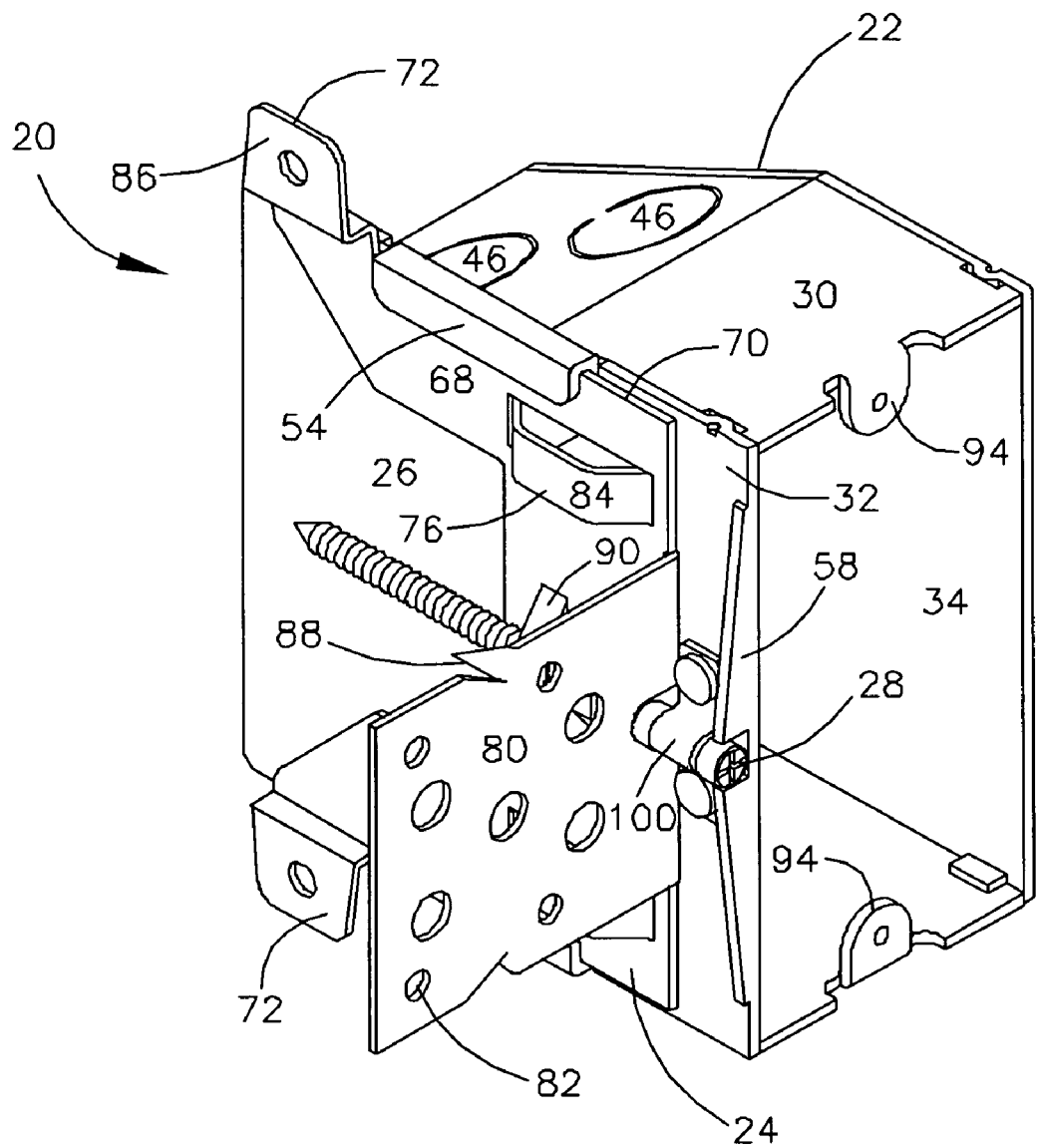
FIG. 1 is a perspective view of the adjustable outlet box of the prior art as shown and described in U.S. Pat. No. 7,312,395.

Referring now to the accompanying drawings, FIG. 1 shows a preferred embodiment of the adjustable outlet box assembly 20 of the prior art. The adjustable outlet box assembly 20 includes a box member 22 and a bracket 24 that is slideable along first side 26 of box member 22 and can be adjusted in position with respect to box member 22 by adjusting screw 28. Box member 22 includes a main body panel 30, a first side panel or sidewall 32 and a second side panel 34.

One or more knockouts or removable wall portions 46 are provided in rear portion 44 of top wall 36. First sidewall 32 includes a U-shaped channels 54 extending outward from top edge 48 and bottom edge 50.

Bracket 24 includes a substantially flat portion 68, top and bottom plate edges 70, ears 72 extending substantially outward of the flat first portion 68 and apertures 74 in each of ears 72. One or more tabs 76 are provided on the bracket 24 extending outward from the first portion 68. First portion 68 of bracket 24 includes a front edge 78 and a second portion or flange 80 extending orthogonally outward from front edge 78. Flange 80 includes apertures 82 therein. Tabs 76 include an outer surface 84, the ears 72 include an outer surface 86 and the outer surfaces 84 of tabs 76 are coplanar with outer surfaces 86 of the ears 72.

Bracket 24 further includes one or more pointed spikes 88 extending rearward from flange 80. One or more straps 90 extend outward from first portion 68 of bracket 24.

Main panel 30, first side panel 32 and second side panel 34, which may be formed of metal are secured together to form adjustable outlet box assembly 20. Box member portion 22 includes arms 94 extending inward from top and bottom walls 36 and 38. Arms 94 include apertures 95 therein for receiving fasteners for later connection of an electrical device (not shown) thereto.

Edges 70 (see FIG. 3) of bracket 24 are slidably disposed within U-shaped channels 54. Adjusting screw 28 includes a smooth base portion and a threaded portion 25 as described in aforementioned U.S. Pat. No. 7,312,395 whose description is incorporated herein in its entirety to the extent relevant hereto. The smooth base portion is held secure to box member 22 by a collar 100 secured to first sidewall 32. Adjusting screw 28 is free to rotate within collar 100 without axial movement with respect to box member 22. Straps 90 engage the threaded portion 25 of adjusting screw 28. Rotation of adjusting screw 28 thus moves box member 22 linearly with respect to bracket 24 with the direction of movement, denoted by directional arrow 102, determined by the direction of rotation of adjusting screw 28.

Installation and operation of adjustable outlet box 20 are described in detail in aforementioned U.S. Pat. No. 7,312,395.

Figure 2:
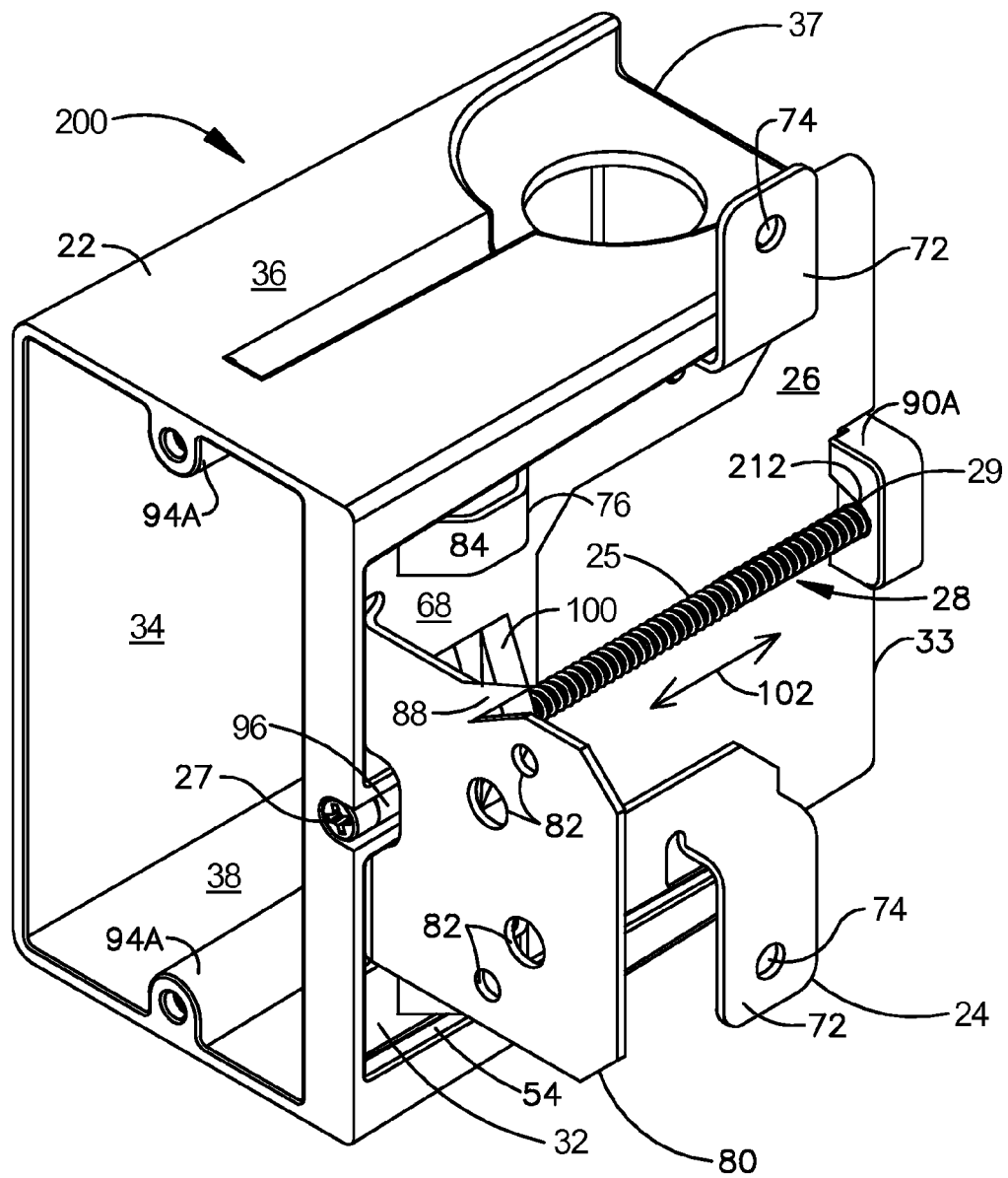
FIG. 2 is a perspective view of the adjustable outlet box of the present invention showing the improvements over the prior art.

The adjustable outlet box 200 of the present invention is depicted in FIG. 2. As shown in this figure, the adjustable outlet box 200 of the present invention is quite similar to that described in U.S. Pat. No. 7,312,395, but includes a number of significant distinguishing features. These distinguishing features include: 1) the elimination of pointed spikes 88 on flange 80 which are no longer needed due to the stabilizing effect of; 2) a flange 90A in the vicinity of the rear edge of 33 sidewall 32, preferably at the very rear edge of sidewall 33, including an aperture 212 that defines a cavity that non-engageably, i.e. allows free rotation, capturing extremity 29 of adjusting screw 28 remote from adjusting screw head 27; and 3) the introduction of channels 94A in lieu of arms 94 (see FIG. 1) of the prior art structure. This last distinguishing feature is made possible by the preferred manufacture of body 22 of adjustable outlet box 200 by molding from a polymeric material in lieu of forming from metal as described in U.S. Pat. No. 7,312,395.

Introduction of flange 90A with its contained capture cavity/aperture 212, at the rear edge 33 of sidewall 32 within an aperture 35 in sidewall 32 that is at least partially defined by rearwall 37 provides significant dimensional stabilization of the body 22 as adjustment screw 28 is tightened, flange 90A with its contained capture cavity/aperture 212 assuring orthogonal alignment of sidewall 32 with flange 80 that is securely fastened to a stud or other structure by appropriate screws, nails or other fastening devices located in apertures 82. The stiffness of adjustment screw 28 serving to provide such alignment and the elimination of any skewing of box 22 that might be introduced by over tightening thereof by engagement of a suitable tool with head 27 of adjusting screw 28.

As will be apparent to the skilled artisan, additional at least one flange 90A includes an aperture 212 that penetrates flange 90A so as to allow free rotation of screw extremity 29 within flange 90A by virtue of the capture cavity defined by aperture 212 in flange 90A.

Figure 3:
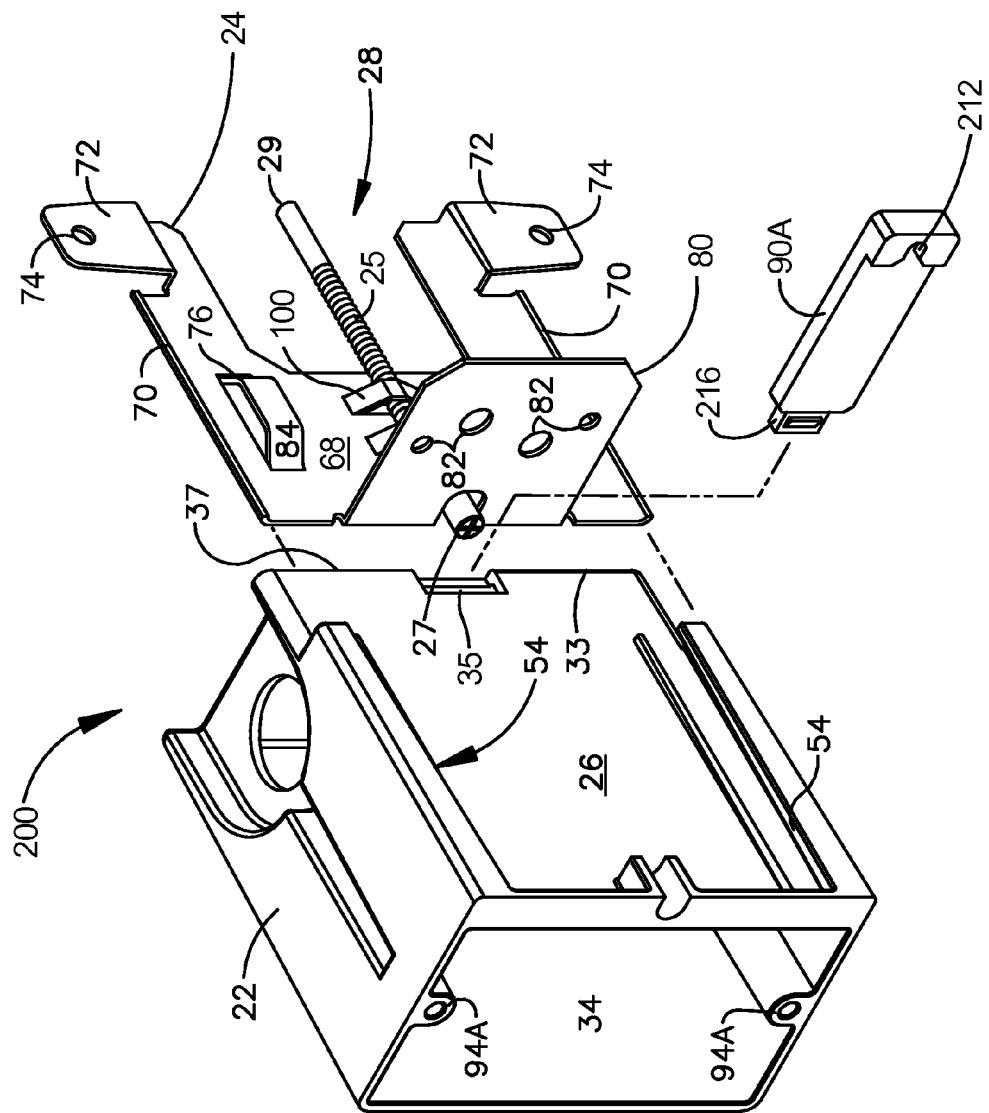
FIG. 3 is a partially disassembled view of the adjustable outlet box of the present invention.

As best seen in FIG. 3, flange 90A inserts through aperture 35 and can be retained therein by an engagement tab 216 or other mechanism that retains flange 90A in aperture 35.

There has thus been described a novel and improved adjustable outlet box that eliminates the shortcomings of the previously described prior art adjustable outlet box.

As the invention has been described, it will be apparent to those skilled in the art that the same may be varied in many ways without departing from the spirit and scope of the invention. Any and all such modifications are intended to be included within the scope of the appended claims.

What is claimed is:

1. An adjustable outlet box assembly comprising:
   a box member including a first sidewall having a rear edge, a rear wall, and a flange extending from said first sidewall at said rear edge;
   two U-shaped channels extending outward from said first sidewall;
   a bracket having a substantially flat first portion including plate edges slidably disposed in the U-shaped channels;
   said bracket including a flange extending outward orthogonally from said first portion;
   an adjusting screw offset outwards from said first portion of said bracket for adjusting a position of said bracket with respect to said box member;
   said adjusting screw including an engageable head, a smooth base portion free to rotate with respect to said box member without axial movement with respect thereto, a threaded portion, and an end; and
   said threaded portion of said adjustment screw engaged by a collar on said bracket and the end of said adjustment screw captively and freely turning within an aperture in said flange of said box member whereby rotation of said adjusting screw moves said box member linearly with respect to said bracket with the direction of said movement determined by the direction of rotation of the adjusting screw.

2. The adjustable outlet box assembly of claim 1 wherein said flange of said box member penetrates an aperture in said sidewall and is removably retained in that position.

* * * * *